(12) United States Patent
Levesque et al.

(10) Patent No.: US 9,246,844 B2
(45) Date of Patent: *Jan. 26, 2016

(54) METHOD FOR ACTIVATING AND DEACTIVATING CLIENT-SIDE SERVICES FROM A REMOTE SERVER

(71) Applicant: Unwired Planet, LLC, Reno, NV (US)

(72) Inventors: Michel Levesque, Dummondville (CA); Jon Witort, Berkeley, CA (US); Sousso Kelouwani, Laval (CA)

(73) Assignee: Unwired Planet, LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,745

(22) Filed: Feb. 10, 2015

(65) Prior Publication Data

US 2015/0156138 A1    Jun. 4, 2015

Related U.S. Application Data

(63) Continuation of application No. 13/907,701, filed on May 31, 2013, now Pat. No. 9,043,424, which is a continuation of application No. 13/284,579, filed on Oct. 28, 2011, now Pat. No. 8,484,305, which is a continuation of application No. 11/424,727, filed on Jun. 16, 2006, now Pat. No. 8,069,209.

(51) Int. Cl.

| | |
|---|---|
| *G06F 15/16* | (2006.01) |
| *G06F 15/173* | (2006.01) |
| *H04L 12/927* | (2013.01) |
| *G06F 9/48* | (2006.01) |
| *H04L 29/06* | (2006.01) |
| *H04L 29/08* | (2006.01) |
| *H04W 48/02* | (2009.01) |

(52) U.S. Cl.
CPC .............. *H04L 47/803* (2013.01); *G06F 9/485* (2013.01); *H04L 67/025* (2013.01); *H04L 67/40* (2013.01); *H04L 67/42* (2013.01); *H04W 48/02* (2013.01)

(58) Field of Classification Search
None
See application file for complete search history.

(56) References Cited

U.S. PATENT DOCUMENTS

| | | | |
|---|---|---|---|
| 6,522,876 B1 * | 2/2003 | Weiland et al. ............ | 455/414.1 |
| 6,894,994 B1 | 5/2005 | Grob et al. | |
| 6,937,566 B1 | 8/2005 | Forslow | |
| 6,950,862 B1 | 9/2005 | Puthiyandyil et al. | |
| 6,970,459 B1 | 11/2005 | Meier | |
| 7,013,342 B2 | 3/2006 | Riddle | |
| 7,016,973 B1 | 3/2006 | Sibal et al. | |

(Continued)

FOREIGN PATENT DOCUMENTS

WO    2005025252    3/2005

*Primary Examiner* — Peling Shaw
(74) *Attorney, Agent, or Firm* — Sheppard, Mullin, Richter & Hampton LLP (57) ABSTRACT

A system, apparatus, and method for controlling the operation of a service in a client device. The invention uses an existing protocol which is used for communications between an application resident in the device and a remote server to convey information about the service to the application. The information may be relevant to a service specific function, such as configuration or provisioning, or an activation or de-activation instruction, for example. The application receives the service related information, processes the information and then provides the information to the service via a notification channel. The service related information may be incorporated into a message sent from the remote server to the client device by using an element of the protocol, for example, by appending a text string to a header.

22 Claims, 3 Drawing Sheets

(56) References Cited

U.S. PATENT DOCUMENTS

| | | |
|---|---|---|
| 7,269,629 B2 * | 9/2007 | Zmudzinski et al. ......... 709/207 |
| 2003/0187992 A1 * | 10/2003 | Steenfeldt et al. ............ 709/227 |
| 2005/0259795 A1 * | 11/2005 | Didcock et al. ............ 379/88.13 |
| 2006/0023634 A1 | 2/2006 | Morandin |
| 2006/0224750 A1 * | 10/2006 | Davies et al. ................. 709/229 |
| 2007/0124393 A1 * | 5/2007 | Maes ............................ 709/206 |

* cited by examiner

METHOD FOR ACTIVATING AND DEACTIVATING CLIENT-SIDE SERVICES FROM A REMOTE SERVER

CROSS-REFERENCE TO RELATED APPLICATIONS

This application is a continuation of U.S. application Ser. No. 13/907,701, filed May 31, 2013, which is a continuation of U.S. application Ser. No. 13/284,579, filed Oct. 28, 2011, now U.S. Pat. No. 8,484,305, which is a continuation of U.S. application Ser. No. 11/424,727, filed Jun. 16, 2006, now U.S. Pat. No. 8,069,209, the disclosures of which are hereby incorporated herein by reference.

BACKGROUND OF THE INVENTION

The present invention is directed to systems, apparatus and methods of providing data services to a user, and more specifically, to a method for activating and deactivating such services on a client device using a server communicating with the client device over a network.

Data services include, for example, data, content, applications, functions, and processes that are communicated to a client device over a network from a server or other source. Providing the services therefore requires the use of network resources, such as bandwidth, as well as processing and data storage resources of the client and server devices. In addition, providing data services over a network can introduce inefficiencies and a less than optimal user experience because of inherent characteristics of the network, e.g., latency.

One situation in which the network characteristics and resource constraints of the network, client, or server can become important is in the provision of new services to a client device. Such services can include new applications, new content (e.g., a screensaver, image, or file), data processing capabilities, eCommerce functions, enabling a new or modified function, or other services that are desired to be active on the client device. Typically, such new services must be downloaded to the client over the network from a remote content server or other source. The new service must then be installed and executed by the client device.

In other cases, it may be necessary to provide configuration or access control data to a client device in order to activate a service that was present, but inactive, in a client. For some services, this may not be practicable due to a potential significant increase of traffic on the network or because there does not exist a system for providing such configuration or access control data. In some situations, it may be desirable to de-activate a service that already is present and was previously activated on a client device. Such a situation may arise when a user no longer wishes to be billed for a service, or a service provider finds it necessary to curtail usage of the service.

A disadvantage of these methods for providing services to a client device is that they require either that a large amount of data be transported, or that multiple exchanges of data occur in order to configure and activate a service. For example, if it requires probing a network system to activate or deactivate a client service, the overhead these probing activities represent on the network may be significant and unnecessary, especially if the service is never activated. Moreover, they may increase the delay for a client device to access a distant content on a network. Further, these methods of providing services may not have an associated method of de-activating a service.

What is desired is a system and method for activating and de-activating a service for a client device that overcomes the noted disadvantages.

BRIEF SUMMARY OF THE INVENTION

The present invention is directed to a system, apparatus, and method for controlling the operation of a service in a client device. The invention uses an existing protocol which is used for communications between an application resident in the device and a remote server to convey information about the service to the application. The information may be relevant to a service specific instruction or function, for example, configuration or provisioning, or an activation or de-activation instruction. The application receives the service related information, processes the information and then provides the information to the service via a notification channel. The service related information may be incorporated into a message sent from the remote server to the client device by using an element of the protocol, for example, by appending a text string to a header.

In one embodiment, the present invention is directed to a method of executing a function of a service contained in a client device that includes establishing a communication channel between the client device and a remote server, where the communication channel enables communication between an application in the client device and the remote server in accordance with a protocol, utilizing an element of the protocol to enable the protocol to convey information relevant to the function of the service, sending a message to the client device from the remote server in accordance with the protocol, where the element of the protocol includes information relevant to the function of the service, receiving the message at the client device, using the application in the client device to process the received message, thereby extracting an instruction for executing the function of the service, and providing the instruction to the service by a notification channel, where the notification channel enables communication between the application in the client device and the service.

In another embodiment, the present invention is directed to a method of executing a function of a service contained in a client device that includes receiving a message at a client device from a remote server over a communication channel, where the message conforms to a protocol used to exchange information between an application resident in the client device and the remote server, with an element of the protocol being used to convey information relevant to the function of the service, processing the received message using the application to extract an instruction for executing the function of the service, and providing the instruction to the service by a notification channel, where the notification channel enables communication between the application in the client device and the service.

In yet another embodiment, the present invention is directed to a client device that includes a resident application configured to communicate with a remote server over a communication channel in accordance with a protocol, a service contained in the client configured to communicate with the resident application over a notification channel, where the resident application is configured to receive a message from the remote server containing information relevant to the operation of the service, process the received message using the resident application to extract an instruction for operating a function of the service, and provide the instruction to the service by the notification channel.

Other objects and advantages of the present invention will be apparent to one of ordinary skill in the art upon review of the detailed description of the present invention.

DETAILED DESCRIPTION OF THE INVENTION

The present invention is directed to a system, apparatus and method for activating or de-activating a service in a client device. In the present context, a service may include, but is not limited to, an application, a specific service such as location, presence, or eCommerce, or a set of configuration parameters for the client device. In the context of the present description, the service may also be a type of content, such as a screen saver, image or other display. Although the invention will be described in the context of a client-server architecture, it should be noted that use of the client-server terminology is not intended to limit the ways in which the invention may be implemented, nor the types of client devices or server devices that may be used to implement the invention. In this regard, a client may be defined as a system that accesses a (remote) service or content on another system over some type of network. Similarly, a server may be defined as a system that provides a service or content to another system over a network. Note that in the context of the present description, a network may be a wired network, a wireless network, some type of hybrid network, or a combination of such networks. The network may be a private network, public network (e.g., the Internet) or some combination of public and private networks.

Typically, a client and server will communicate over a network in accordance with a protocol, which is a set of standard rules for functions such as data representation, signaling, authentication, and error correction. Examples of such protocols include TCP, IP, HTTP, POP3, and SMTP. The client may be a mobile device (cell phone, PDA, laptop computer, etc.) or a network application or service of such a device (a browser, an email client, etc.). The server may refer to a content server (web server, email server) or a proxy/gateway server sitting between the client and a content server.

As the inventors have recognized, a user's experience is enhanced when that experience has some or all of the following characteristics:

(1) it takes less time to retrieve desired content or services;

(2) the amount of traffic between the client and server is reduced when accessing the same service multiple times;

(3) the quality of the client-server link over the network is reliable and stable; and (4) the user can access content that otherwise may not be accessible.

Furthermore, as the inventors have also recognized, in order to provide efficient resource usage and optimal network transport characteristics, and hence a better user experience, a service activation and de-activation system and method should strive to satisfy the following desired characteristics:

(1) a client-side service should only be activated if an associated server side service exists on the server or if the client-side service is allowed to be used (e.g., a wireless network operator could allow an application only to some users);

(2) it should be possible for a server to deactivate the client-side service; and (3) if the client service is deactivated, it should generate none or minimal network activity to re-activate itself (e.g., it should remain deactivated until receipt of an activation instruction via the notification channel).

Figure 1:
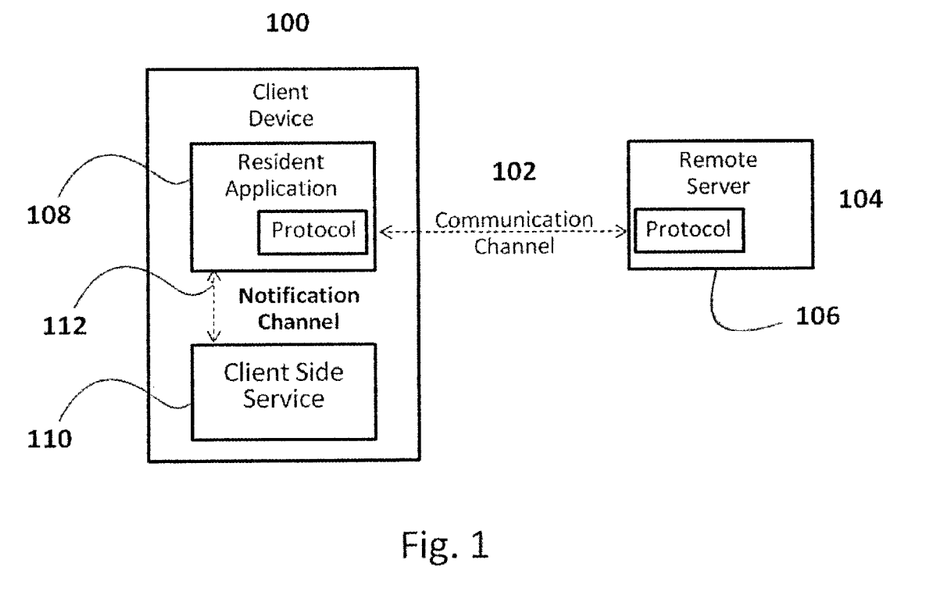
FIG. 1 is a functional block diagram depicting the primary functional elements that can be used to implement an embodiment of the present invention.

FIG. 1 is a functional block diagram depicting the primary functional elements that can be used to implement an embodiment of the present invention. As shown in the figure, a client device 100 communicates over a communication channel (e.g., a network) 102 with a remote server 104. The device 100 and server 104 communicate over the channel 102 in accordance with a protocol (represented by the box labeled "Protocol" 106 in device 100 and server 104). The device 100 may be a personal computer, laptop computer or mobile device such as a wireless phone, or PDA that is capable of wireless communications, although the invention may be implemented utilizing communications between the client and server over a wired, wireless, or hybrid network. Remote server 104 may be a content server, application server, storage facility, or other type of server. Client device 100 may include one or more resident applications 108, such as a browser or email application. The browser is used to request and present web pages on the device, while the email application may be used to create, send, and receive email messages. Note that resident application 108 may have a corresponding application on remote server 104 that is capable of interacting with it to implement the functionality of the application.

As shown in FIG. 1, the device also includes a client side service 110. This service is resident in the client device 100, but is initially in an un-activated state (or deactivated, if previously activated). Typically, the client side service 110 may be utilized as the result of executing a set of processing instructions. The software code, instruction set, or other form of executable instruction used to access or otherwise operate the client side service 110 may either be embedded in the device 100 or provided to the device 100 via a provisioning or download process that occurs over a communication channel.

The resident application 108 in the device 100 is capable of exchanging data, instructions, commands, or other forms of information with the client side service 110 by means of a notification channel 112. The notification channel 112 may be implemented as a method, protocol, network, and/or communication channel that is used by the resident application 108 and the client side service 110 to share information. For example, the notification channel 112 could be implemented as a function call (at a programmatic level), an operating system inter-process message, a communication that uses a mutually understood protocol, etc.

Figure 2:
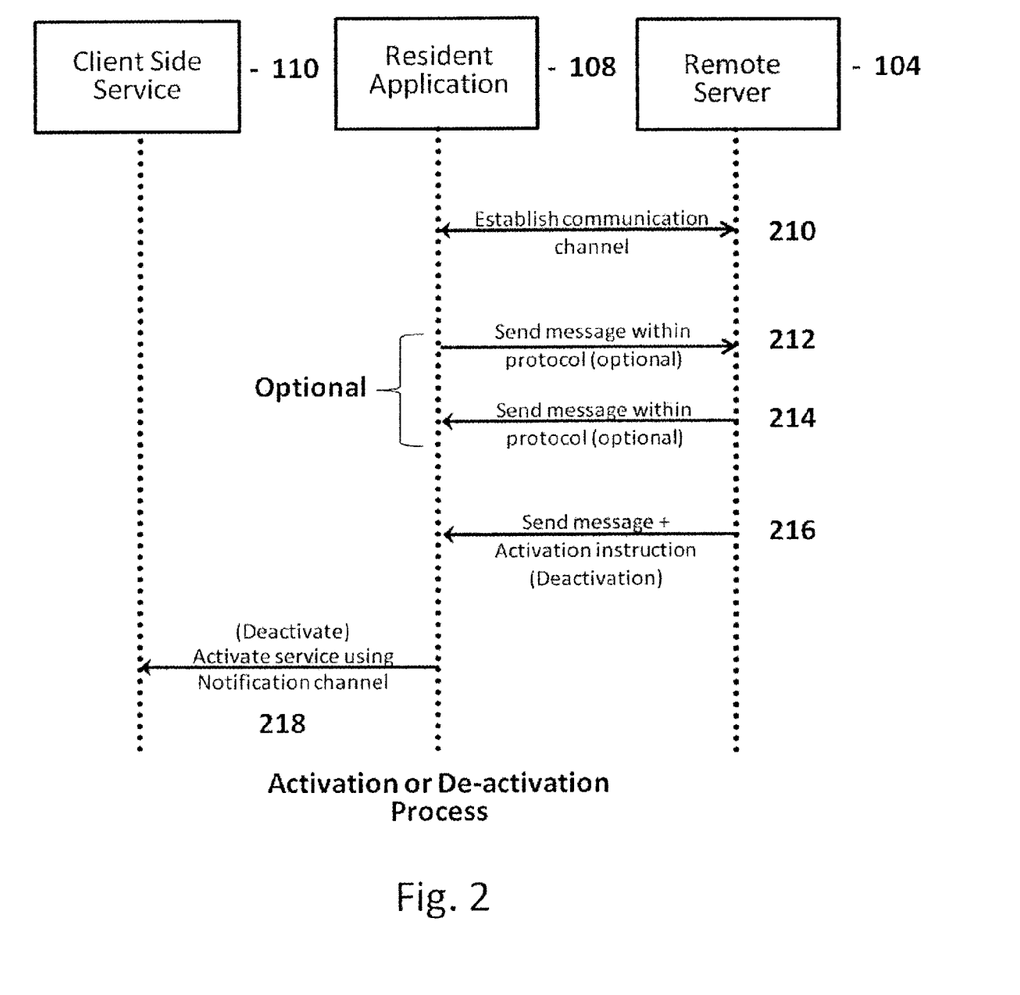
FIG. 2 is a call flow diagram depicting a typical call flow that may be used to activate or de-activate a process or other client side service in accordance with the present invention.

FIG. 2 is a call flow diagram depicting a typical call flow that may be used to activate or de-activate a process or other client side service in accordance with the present invention. As shown in FIG. 2, the method for activating or deactivating the process or client side service typically begins with establishing or initializing a communication channel 210 between the resident application 108 and the remote server 104. Note that in some cases, the communication channel may not require an establishment or initialization process apart from the actual transport of data, and may be a medium capable of transferring data between two nodes of a network. For example, for purposes of the present invention, a channel may be a physical wire, cable or a wireless connection. In the case of a wireless network, the communication channel may not require an independent "establishment" operation prior to the transmission of data, as in a PUSH operation. The communication channel (element 102 of FIG. 1) is used to transport protocol conforming messages between the device 100 and the remote server 104. In one embodiment, this communication channel 102 could be a TCP/IP connection over a wireless network, wire line network or combination of such networks.

After establishing or initializing the channel (if required prior to transport of data), data may be shared between the device 100 (or more specifically, resident application 108 in client device 100) and the remote server 104 by means of a common protocol 106. Note that the current invention does not limit the scope of the definition of a common protocol aside from the requirement that it support or enable a message to be exchanged between the remote server 104 and the device 100. In one sense, a protocol is a set of rules that define a format for communications between two elements of a network. In particular, in the case of activating or de-activating a process or service, protocol 106 should be capable of supporting or enabling a message or other form of information to be sent from remote server 104 to client device 100. As an example of a possible protocol, the HTTP protocol is a request/response system, meaning that the resident application (e.g., a browser) sends HTTP requests to the remote server (e.g., a web server). Thereafter, the remote server sends a response message to the resident application.

In accordance with the present invention, the client device 100, resident application 108, remote server 104 and protocol 106 are configured or otherwise modified as required to enable one or more instructions or messages to be "piggybacked" onto an underlying message sent to the device. By piggybacking is meant to append or otherwise integrate the one or more instructions or messages within the standard protocol used to communicate the underlying message exchanged between the client device 100 and remote server 104. In this way a new message is not required to be generated to exchange the activation, de-activation or other instruction. This enables the present invention to be used to activate, de-activate, or otherwise control a client side service using an already existing communication channel. This is accomplished without generating a significant increase in network data; nor does it require the creation of another communication channel or new message. The new instructions or messages integrated into the protocol are used to instruct the resident application 108 to activate or de-activate the client side service 110, with the instructions being communicated between the resident application 108 and client side service 110 over the notification channel 112.

In the context of the current invention, the resident application 108 should be capable of understanding and where needed, acting upon the new instructions or messages to communicate as needed with the client side service 110 to activate or de-activate that service. For example, once such new instructions or messages are received by the resident application 108 within the protocol, the application should be capable of analyzing and interpreting the instruction or message received from the remote server 104 and, if necessary, execute what processes are needed to communicate those instructions to the client side service. For example, the new instructions or message may be intended to cause an activation or deactivation of the client side service 110. Upon receipt and where needed, analyzing and/or interpreting the new instructions or messages, the resident application 108 communicates with the client side service 110 via the notification channel 112 in a manner designed to implement the instructions or messages.

Returning to FIG. 2, after establishing a communication channel (stage 210, if required), resident application 108 may exchange one or more messages with remote server 104 (stages 212 and 214), with the need for or contents of such an exchange being determined by the requirements of the underlying protocol 106. As previously mentioned, inclusion of stage 210 in the figure is not meant to imply or suggest that a separate establishment or initialization operation is required in all cases (i.e., for all possible channels and protocols suitable for implementation of the invention). As such, its inclusion in the figure is not intended to preclude embodiments of the present invention that utilize methods of communication, such as PUSH technologies and others, that may not include formal establishment of a two-way communication channel/medium prior to exchange of data. For example, a server could send an activation message in the form of a UDP packet (User Datagram Protocol) to a predefined port. In the context of the present invention, stage 210 is intended to refer to taking what steps or actions are necessary, if any, to enable transfer of data (e.g., an activation or de-activation instruction) to the client device. Note further that stages (212 and 214) are optional in that they may not be required by all protocols that can be used as part of the present invention. For instance, some protocols works in a request/response manner, meaning that the client issues a request to the server, and the server sends back a response (e.g., HTTP). With such protocol, the stage 212 represents the request, while the response is the stage 214 and/or 216. In a more specific example, in HTTP, the first message sent is the browser's request toward the server (stage 212). In such an example, the activation notification could be appended to the HTTP response to the browser (stage 216), bypassing stage 214. In a POP3 protocol for example, once the communication channel is established, the first message sent is by the POP3 server which sends its "greeting line" to the client. And in this scenario, the activation instructions could be appended within the greeting line (stage 216), bypassing both stages 212 and 214.

After completing the exchange (if required), remote server 104 sends a message to resident application 108 (stage 216 of FIG. 2). This message may be part of a standard communication or other exchange of messages between resident application 108 and remote server 104. In accordance with the present invention, the message includes an activation, de-activation or other form of instruction for client side service 110, with that instruction being appended to or otherwise integrated into protocol 106. Upon receipt of the message, application 108 processes the message and provides the instruction to client side service 110 via notification channel 112 (stage 218).

As discussed, the present invention conveys activation, de-activation, or other instructions to the client side service by utilizing the relevant protocol and piggybacking information within it. It is important to note that the protocol may be completely independent and distinct from the client-side service, and is used as a transport mechanism for instructions to the client service. Typically, the protocol will be utilized by adding information to an element of the protocol, e.g., introducing a data string representing the desired instruction into a command, header, message, response or data field that is part of the protocol. The data string is then processed in accordance with the protocol to extract the instruction and pass the instruction to the client side service 110. Note that the "instruction" may be a command to execute an operation, activate or de-activate a function or application, or part of a discovery function to make the client device 100 aware of an application or functionality available over the network or via the server.

One example of a possible protocol that may be used to implement the invention is HTTP, which includes one or more headers, each with one or more associated data fields. Note that although the implementation details for the activation and de-activation process will depend to some extent on the protocol used to implement the inventive process, the underlying concept is common to each protocol; to add information to a message being exchanged between the resident application and a remote server that will enable the resident application to alter or otherwise control the behavior of the client side service.

With regards to HTTP, the method of the present invention may be implemented by adding a text string representing the desired instruction or command to an element of the protocol, e.g., a message header. In one implementation, the remote server 104 may respond to a request from the resident application 108 (e.g., a browser) by adding a header and associated data field to the response message (e.g., stage 216). The header and data field may be used to inform the resident application 108 of the existence of a server side application or function, to identify the server or some aspect of the network, or to perform another desired function. The header and field may also be used to convey an instruction (such as activate or de-activate) to the client side service 110. Thus, the added field may be used to transfer to the resident application an instruction for the control or other operation of the client side service. For example, activation of the client side service could be accomplished by adding "X-client-side-service: On" to the header. Note that by default, a HTTP field beginning with an "X" that is not understood by the browser is ignored or discarded. If the resident application 108 is capable of understanding this new field, it will act to forward the message, command or activation to the client side service 110 using the notification channel 112.

In accordance with the present invention, it is intended to seamlessly add activation, de-activation, or other commands/control instructions to a message being exchanged between a resident application in a client device and a remote server by embedding the commands/control instructions within the protocol being used for communications between the resident application and the remote server. Each protocol may have its own specific implementation details, but the underlying concept should be to the same; to utilize an existing protocol to convey instructions for the operation of the client side service to the resident application. Thus, it will be apparent that the protocol used and the manner in which the protocol is modified or otherwise altered will depend upon the resident application and the type of protocol and/or messages it normally utilizes.

As a further example, the activation or de-activation mechanism could be implemented within an email application that utilizes a protocol such as POP3. For example, once the TCP connection is established between an email client (in this case the resident application of FIG. 1) and a POP3 server, the server may send a "greeting line." To notify the resident application of the desired operation with regards to the client side service, it is possible to append a distinctive substring at the end of the greeting line (e.g., "activate" or "de-activate"). After the email client processes the substring in the greeting line, it will communicate with the client side service via the notification channel and convey the command/instruction to the client side service.

Further, note that the present invention is not limited to embodiments in which a single application is activated or de-activated (or otherwise caused to execute some function) in response to a message. For example, SIP (Session Initiation Protocol) could be used with SDP (Session Description Protocol) in conjunction with the inventive method to activate a service or function for more than one application in response to a single message.

Figure 3:
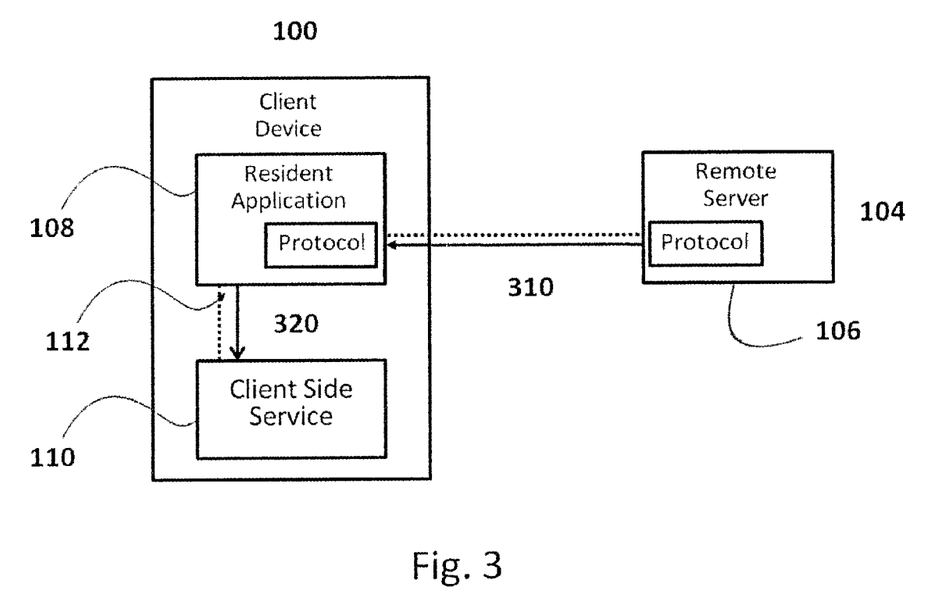
FIG. 3 is a block diagram depicting the primary processes that can be used to implement an embodiment of the method of the present invention.

FIG. 3 is a block diagram depicting the primary processes that can be used to implement an embodiment of the method of the present invention. As shown in the figure, after establishing a communication channel between resident application 108 in client device 100 and remote server 104, the remote server sends a message 310 to the resident application. Message 310 contains an instruction, command, or other form of communication intended to be executed by client side service 110. The instruction, command, or other form of communication is embedded within protocol 106. Upon receipt of message 310, resident application 108 processes message 310 and identifies the embedded instructions, commands, or other communication intended for client side service 110. Resident application 108 then provides the instructions, commands, or other communication intended for client side service 110 to the client side service (via data transfer 320 in the figure).

Note that the entity that acts to piggyback the additional information onto or otherwise embed the information within the relevant protocol could be the remote server, a proxy server situated between the client device and the remote server and in communication with both, or another suitable mechanism. For example, a proxy server may perform proxy services (e.g., a HTTP proxy) and/or other data processing operations (e.g., data compression/decompression, optimization).

In addition to the general activation and de-activation processes described, the present invention may be utilized to perform other types of functions, and to perform more specific examples of activation or de-activation. One possible specific activation or deactivation operation is that of "personalized activation or de-activation." This refers to a method for activating and deactivating client-side services from a remote server on a per service or per user basis. Such a method could be used for example, to enable a service only to users that subscribed or paid for it. A wireless network operator often proposes many services to their users with the associated cost. The current invention could enable them to more easily manage what service to activate or de-activate for which user based on the user's subscription plan.

To enable this embodiment, the current invention may incorporate a process where the device's resident applications provide information about the client side service to the remote server. For example, the resident application may add signature information regarding the client side service to a request sent to the remote server. This information can be unique for a given service, and/or unique for each user. When the message is received at the remote or proxy server, the signature information is processed. If the server authorizes use of the client-side service for the particular user or service, then the server can use the existing protocol to piggyback activation information into the response to the device. Among other information, the "signature" may contain the client device model, brand, OS version, and/or other information about the type or capabilities of the client device or user. A specific example for this in the HTTP protocol is the "user-agent" string. This field represents the information on the browser. In the mobile wireless environment, the user-agent includes the operating system, the browser type, the device model and version, providing the server-side significant information on the device to enable or not enable (or disable) a service on a per device basis.

Although the present invention has been described with reference to the activation or de-activation of a client side service, it may also be used for other purposes. For example, the present invention may be used to control the download and/or installation of software. In this embodiment, the resident application could be used to provide configuration, access control, authentication, or other relevant data to an application in the client. The data provided could be used by the application to implement a new function, modify an existing function, or provide access to data or functionality of the application. The data provided could also be used to update a set of data used by the application or direct the application where to find data on the network. In addition, the data provided could be used to permit access to content stored in the client device. In this manner, a digital rights management feature could be implemented wherein content is provided to the client device separately from an access control key which is provided using the protocol in accordance with the present invention.

Another possible implementation of the current invention arises when there exists multiple client side services in parallel on the client device, with each client side service being capable of being activated or de-activated. In such a case, activation or deactivation could be accomplished by several methods. For example, each client-side service may have its own unique signature. Upon receiving a message from the remote server, or upon constructing a request to be sent to the remote server, the resident application may insert one or more client side service signatures into the request. The remote server could then return via the response path an independent activation notification for one or more of the services. In contrast, all client side services may have the same signature and be activated or de-activated as a group.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

The invention claimed is:

1. A wireless client device comprising:
memory;
one or more processors;
an operating system; and
a first application stored in the memory and, when executed by the one or more processors, configured to:
communicate with a remote server over a first communication channel, the first communication channel comprising a wireless connection;
communicate with a second application on the wireless client device over a second communication channel, the second communication channel being on the wireless client device, the second application being separate from the first application, the second application being capable of providing access to data or functionality that is inaccessible unless access to the data or the functionality is enabled;
receive a first message comprising first information, the first information related to a request for enablement of access to the data or the functionality;
send, over the first communication channel to the remote server, a second message comprising second information, the second information relating to the request for enablement of access to the data or the functionality;
receive, over the first communication channel from the remote server, a third message comprising activation information related to the request for enablement of access to the data or the functionality, the activation information indicating whether to instruct the second application to provide access to the data or the functionality; and
send, when the activation information indicates to instruct the second application to provide access to the data or the functionality, a fourth message over the second communication channel to the second application, the fourth message causing the second application to provide access to the data or the functionality.

2. The wireless client device of claim 1, wherein the fourth message is an operating system inter-process message.

3. The wireless client device of claim 1, wherein the fourth message is a function call.

4. The wireless client device of claim 1, wherein the second information comprises at least one of: an information item identifying the second application; an information item identifying a user account associated with the wireless client device; and an information item associated with the wireless client device.

5. The wireless client device of claim 1, wherein the data or the functionality is stored on the wireless client device.

6. The wireless client device of claim 1, wherein the data or the functionality is to be retrieved by the second application from a network location.

7. The wireless client device of claim 1, wherein the first application is configured to communicate with the remote server over the first communication channel in accordance with a communication protocol and wherein the second message and the third message each comprises one or more elements in accordance with the communication protocol.

8. The wireless client device of claim 1, wherein the first communication channel comprises the Internet.

9. The wireless client device of claim 1, wherein the wireless client device is a cell phone.

10. The wireless client device of claim 1, wherein the second application has been downloaded to the wireless client device over a wireless connection.

11. A non-transitory computer-readable storage medium comprising computer-executable instructions which, when executed by one or more processors at a wireless client computing device comprising an operating system, a first application and a second application that is separate from the first application, wherein the second application is capable of providing access to data or functionality that is inaccessible unless access to the data or the functionality is enabled, cause the wireless client computing device to implement a method, the method comprising:
the first application receiving a first message comprising first information, the first information related to a request for enablement of access to the data or the functionality;
the first application sending, over a first communication channel including a wireless connection to a remote server, a second message comprising second information, the second information relating to the request for enablement of access to the data or the functionality;
the first application receiving, over the first communication channel from the remote server, a third message comprising activation information related to the request for enablement of access to the data or the functionality, the activation information indicating whether to instruct the second application to provide access to the data or the functionality; and the first application sending, when the activation information indicates to instruct the second application to provide access to the data or the functionality, a fourth message over a second communication channel to the second application, the fourth message causing the second application to provide access to the data or the functionality, wherein the second communication channel is on the wireless client computing device.

12. The non-transitory computer-readable storage medium of claim 11, wherein the fourth message is an operating system inter-process message.

13. The non-transitory computer-readable storage medium of claim 11, wherein the fourth message is a function call.

14. The non-transitory computer-readable storage medium of claim 11, wherein the second information comprises at least one of: an information item identifying the second application; an information item identifying a user account associated with the wireless client computing device; and an information item associated with the wireless client computing device.

15. The non-transitory computer-readable storage medium of claim 11, wherein the wireless client computing device is a cell phone.

16. A server system, comprising:
one or more processors; and
memory for storing one or more programs, wherein the one or more programs, when executed by the one or more processors, cause the server system to:
receive a first message sent to the server system over a first communication channel including a wireless connection by a first application stored on a wireless client device, the first message comprising first information relating to a request, received by the first application, for enablement of access to data or functionality, wherein a second application that is separate from the first application and an operating system on the wireless client device is capable of providing access to the data or the functionality when access to the data or the functionality is enabled;
process the first information to provide activation information indicating whether to instruct the second application to provide access to the data or the functionality; and
send to the first application, over the first communication channel, a second message comprising the activation information, to enable the first application to send, when the activation information indicates to instruct the second application to provide access to the data or the functionality, a third message over a second communication channel on the wireless client device to the second application, the third message causing the second application to provide access to the data or the functionality.

17. A non-transitory computer-readable storage medium comprising computer-executable instructions which, when executed by one or more processors at a wireless client computing device comprising an operating system, a first application and a second application that is separate from the first application, wherein the second application is capable of providing access to data or functionality that is inaccessible unless access to the data or the functionality is enabled, cause the wireless client computing device to implement a method, the method comprising:

the second application receiving, over a first communication channel on the wireless client computing device, a first message sent by the first application, the first message causing the second application to provide access to the data or the functionality, wherein the first message is received by the second application after the first application has received, over a second communication channel including a wireless connection from a remote server, a second message comprising activation information indicating to instruct the second application to provide access to the data or the functionality; and the second application providing access to the data or the functionality in response to receiving the first message.

18. The non-transitory computer-readable storage medium of claim 17, wherein the first message is an operating system inter-process message.

19. The non-transitory computer-readable storage medium of claim 17, wherein the first message is a function call.

20. The non-transitory computer-readable storage medium of claim 17, wherein the data or the functionality is stored on the wireless client computing device.

21. The non-transitory computer-readable storage medium of claim 17, wherein the second application retrieves the data or the functionality from a network location to provide access to the data or the functionality.

22. The non-transitory computer-readable storage medium of claim 17, wherein the wireless client computing device is a cell phone.

* * * * *